(12) United States Patent
Pillai et al.

(10) Patent No.: US 12,095,907 B2
(45) Date of Patent: *Sep. 17, 2024

(54) GUARANTEED ENCRYPTOR AUTHENTICITY

(71) Applicant: Apple Inc., Cupertino, CA (US)

(72) Inventors: Vishnu Pillai Janardhanan Pillai, Fremont, CA (US); Rantao Chen, San Jose, CA (US); Gianpaolo Fasoli, Redwood City, CA (US); Frederic Jacobs, Canton of Vaud (CH); Rupamay Saha, San Jose, CA (US); Yannick L. Sierra, San Francisco, CA (US); Dian Wen, San Jose, CA (US); Ka Yang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,421

(22) Filed: Jun. 8, 2022

(65) Prior Publication Data

US 2022/0303120 A1    Sep. 22, 2022

Related U.S. Application Data

(63) Continuation of application No. 15/930,838, filed on May 13, 2020, now Pat. No. 11,405,191.

(51) Int. Cl.
*H04L 9/08* (2006.01)
*G06Q 20/38* (2012.01)
(Continued)

(52) U.S. Cl.
CPC ......... *H04L 9/085* (2013.01); *G06Q 20/3829* (2013.01); *H04L 9/3247* (2013.01);
(Continued)

(58) Field of Classification Search
CPC ................. H04L 9/085; H04L 9/3247; H04L 63/0428; H04L 63/061; H04L 63/0823; G06Q 20/3829
See application file for complete search history.

(56) References Cited

U.S. PATENT DOCUMENTS 6,246,771 B1 * 6/2001 Stanton ................. H04L 9/3234
380/286
6,487,660 B1 * 11/2002 Vanstone .............. H04L 9/3273
713/168

(Continued)

OTHER PUBLICATIONS

U.S. Appl. No. 15/930,838, Final Office Action, Mailed on Nov. 17, 2021, 20 pages.

(Continued)

*Primary Examiner* — Phy Anh T Vu
(74) *Attorney, Agent, or Firm* — Kilpatrick Townsend & Stockton LLP

(57) ABSTRACT

Embodiments described herein provide cryptographic techniques to enable a recipient of a signed message containing encrypted data to verify that the signer of the message and the encryptor of the encrypted data are the same party, or at the least, have joint possession of a common set of secret cryptographic material. These techniques can be used to harden an online payment system against interception and resigning of encrypted payment information.

20 Claims, 13 Drawing Sheets

(51) Int. Cl.
*H04L 9/32* (2006.01)
*H04L 9/40* (2022.01)

(52) U.S. Cl.
CPC ........ *H04L 63/0428* (2013.01); *H04L 63/061* (2013.01); *H04L 63/0823* (2013.01)

(56) References Cited

U.S. PATENT DOCUMENTS

| | | |
|---|---|---|
| 6,934,392 B1 | 8/2005 | Vanstone |
| 8,615,651 B1* | 12/2013 | Modadugu ............ H04L 9/3228 |
| | | 713/168 |
| 10,681,038 B1 | 6/2020 | Lambert |
| 11,405,191 B2 | 8/2022 | Pillai et al. |
| 2003/0021419 A1* | 1/2003 | Hansen ................ H04L 9/0637 |
| | | 380/277 |
| 2006/0015751 A1 | 1/2006 | Brickell et al. |
| 2006/0048212 A1* | 3/2006 | Tsuruoka .............. H04L 9/0866 |
| | | 726/4 |
| 2008/0049942 A1* | 2/2008 | Sprunk .................. H04L 9/006 |
| | | 380/283 |
| 2009/0120694 A1* | 5/2009 | Kompalli ............ G06F 3/04883 |
| | | 178/18.03 |
| 2009/0185677 A1 | 7/2009 | Bugbee |
| 2011/0208970 A1 | 8/2011 | Brown et al. |
| 2015/0003615 A1 | 1/2015 | Vanstone et al. |
| 2015/0372811 A1* | 12/2015 | Le Saint ............... H04L 63/068 |
| | | 705/76 |
| 2017/0255937 A1 | 9/2017 | Maddukuri et al. |
| 2019/0238342 A1 | 8/2019 | Lian et al. |
| 2020/0012527 A1 | 1/2020 | Hartsock |
| 2020/0053054 A1 | 2/2020 | Ma et al. |
| 2020/0213111 A1 | 7/2020 | Leavy et al. |
| 2020/0235929 A1 | 7/2020 | Jacobs et al. |
| 2021/0144004 A1 | 5/2021 | Gray et al. |
| 2021/0250172 A1 | 8/2021 | Choyi et al. |

OTHER PUBLICATIONS

U.S. Appl. No. 15/930,838, Non-Final Office Action, Mailed on Apr. 28, 2021, 15 pages.
U.S. Appl. No. 15/930,838, Notice of Allowance, Mailed on Mar. 9, 2022, 12 pages.

* cited by examiner

GUARANTEED ENCRYPTOR AUTHENTICITY

CROSS-REFERENCE TO RELATED APPLICATION

This is a continuation of and claims priority to U.S. patent application Ser. No. 15/930,838, filed May 13, 2020, the entire disclosure of which is incorporated herein by reference.

TECHNICAL FIELD

This disclosure relates generally to data processing systems. More specifically, this disclosure relates to a system and associated methods to enable guaranteed encryptor authenticity to enable verification of the identity of the encryptor of encrypted data.

BACKGROUND

A digital signature is a mathematical scheme for verifying the authenticity of digital messages or documents. A valid digital signature, where the prerequisites are satisfied, provides a strong indication that the received message was created by a known sender and has not been altered in transit. Various digital signature algorithms may be used, such as the Rivest-Shamir-Adleman (RSA), digital signature algorithm (DSA), or the elliptic curve digital signature algorithm (ECDSA). While digital signature algorithms can be used to verify that the message was created by a known sender and was not altered, signature verification does not provide a guarantee that the encryptor of the cyphertext and the generator of the signature are the same party, only that the signature and encryption were performed validly according to the agreed-upon encryption and signature schemes.

SUMMARY

Embodiments described herein provide techniques to enable guaranteed encryptor authenticity to enable verification of the identity of the encryptor of encrypted data. Guaranteed encryptor authenticity is enabled by cryptographically binding the signature and cryptogram generation process by using one or more signing public keys as input to the key derivation process that is used to derive a symmetric encryption key to encrypt a cryptogram within a signed message.

One embodiment provides a non-transitory machine readable medium storing instructions which, when executed by one or more processors of an electronic device, cause the one or more processors to perform operations. The operations include, but are not limited to generating, at the electronic device, a request for use with an online payment system, deriving keying material to encrypt payment information, the keying material derived based on an encryption private key and a signing public key, generating encrypted payment material by encrypting the payment material using the keying material, wherein the payment material identifies a payment mechanism associated with the electronic device, generating a message to send to a server of the online payment system, the message including the encrypted payment information, wherein the message is associated with the request, generating a message signature using the message and a signing private key, the signing private key associated with the signing public key, sending the message and message signature to the server, wherein successful validation of the message signature and successful decryption of the encrypted payment material validates that the encrypted payment material and the signature of the message were generated by a same party, and receiving, from the server, an affirmative response to the request based on a determination that the encrypted payment material and the signature of the message were generated by a same party.

One embodiment provides for a server device associated with an online payment system. The server device includes a network interface, memory, and one or more processors coupled with the network interface and the memory. The one or more processors can execute instructions stored in the memory. The instructions, when executed, cause the one or more processors to receive, via the network interface, a request with a signed message including encrypted payment material, the request associated with the online payment system, validate a signature of the signed message via a signing public key of a sender of the request, generate decryption material to decrypt the encrypted payment material, the decryption material generated based in part on a signing public key of the sender, decrypt the encrypted payment material, wherein successful validation of the signature and successful decryption of the encrypted payment material validates that the encrypted payment material and the signature of the message were generated by the same party, and deny the request in response to determination that the encryptor of the encrypted payment material and the signer of the message are not the same party.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
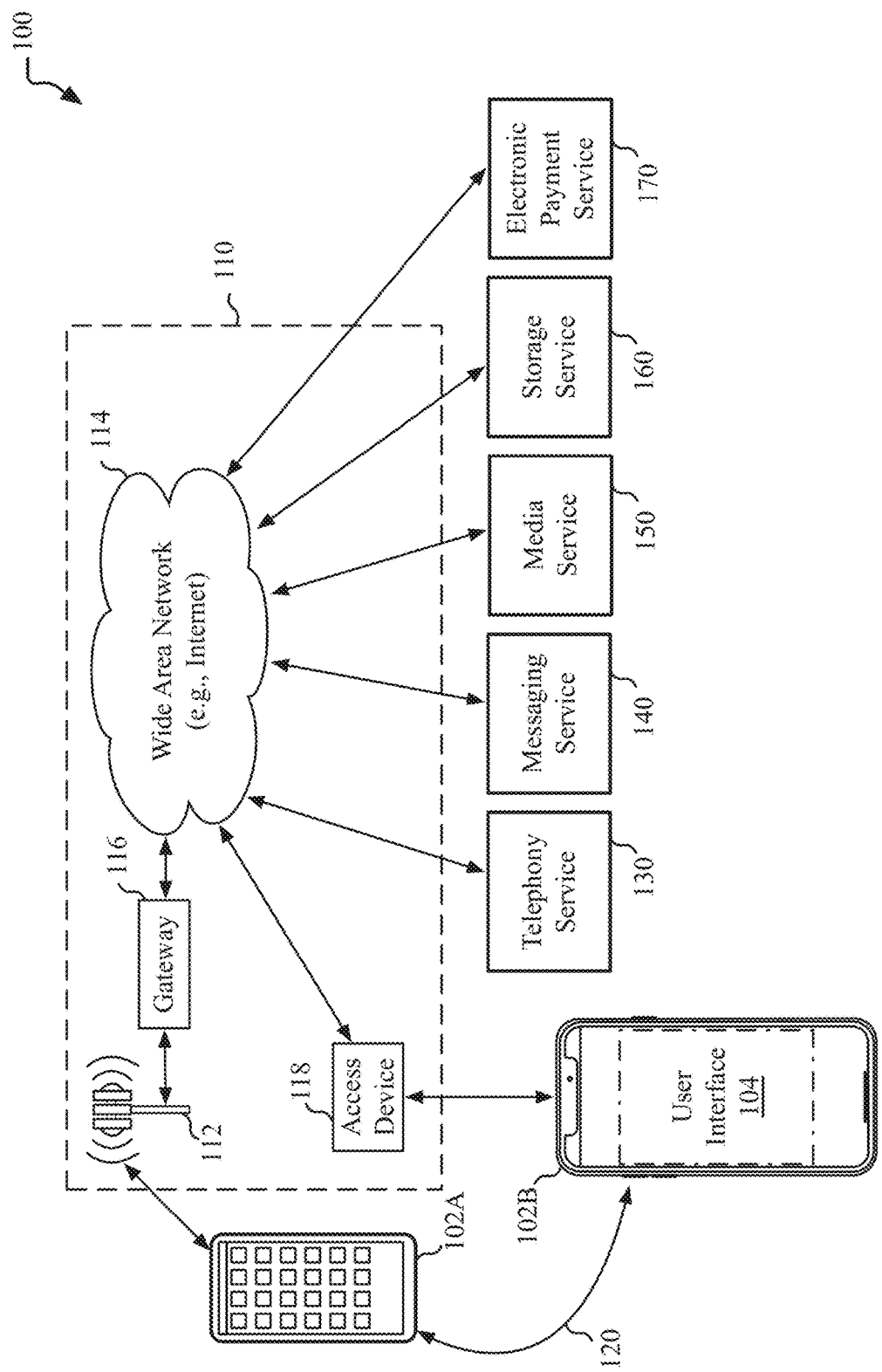
FIG. 1 is a block diagram of an example network operating environment for mobile devices, according to an embodiment.

Embodiments described herein provide techniques to enable guaranteed encryptor authenticity by cryptographically binding the encryption and signature process. In one embodiment, an intended recipient of encrypted data can validate whether the encrypted data was generated by the sending party. A recipient of a service request can validate that the signing party of encrypted data is the actual encrypting party. If the recipient receives a request that is signed by a different party than the sending party, the recipient can deny the request. In one embodiment, a cryptographic implementation is provided in which only the encrypting party can generate a valid signature for encrypted data.

In one embodiment, guaranteed encryptor authenticity is enabled for a mobile payment system that uses an Elliptic Curve Integrated Encryption Scheme (ECIES) to enable data encryption and ECDSA for data integrity, data origin authentication, and non-repudiation. Guaranteed encryptor authenticity may be enabled by including one or more elements of the signing key material that is used to generate an ECDSA signature as input to the ECIES key derivation function. One or more elements of the signing key material may also be concatenated with the encrypted message. A recipient can then verify that the sender of encrypted data is the encryptor of the encrypted data. Any goods or service request that includes encrypted data that is not verifiably encrypted by the sender may then be rejected.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a feature, structure, or characteristic described in conjunction with the embodiment can be included in at least one embodiment. The appearances of the phrase "embodiment" in various places in the specification do not necessarily all refer to the same embodiment.

It should be noted that there can be variations to the flow diagrams or the steps (or operations) described therein without departing from the embodiments described herein. For instance, the steps can be performed in parallel, simultaneously, a differing order, or steps can be added, deleted, or modified.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of data processing systems, user interfaces for such devices, and associated processes for using such devices are described. In some embodiments, the data processing system may comprise a portable communication device such as a mobile telephone that also contains other functions, such as PDA and/or music player functions. Exemplary embodiments of portable multifunction devices include, without limitation, the iPhone®, iPad®, and iPod touch® devices from Apple Computer, Inc. of Cupertino, Calif.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B.

Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with a service provider that provides or enables one or more services. Exemplary services include a telephony service 130, a messaging service 140, a media service 150, a storage service 160, and an electronic payment service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The electronic payment service 170, also referred to as a mobile payment service, can enable a user to initiate, authorize, and confirm an exchange of financial value in return for goods and services via the one or more wired and/or wireless networks 110. Other services can also be provided, including a software update service to update operating system software or client software on the mobile devices. In one embodiment, the messaging service 140, media service 150, storage service 160, and electronic payment service 170 can each be associated with a cloud service provider, where the various services are facilitated via a cloud services account associated with the mobile devices 102A-102B.

Figure 2A:
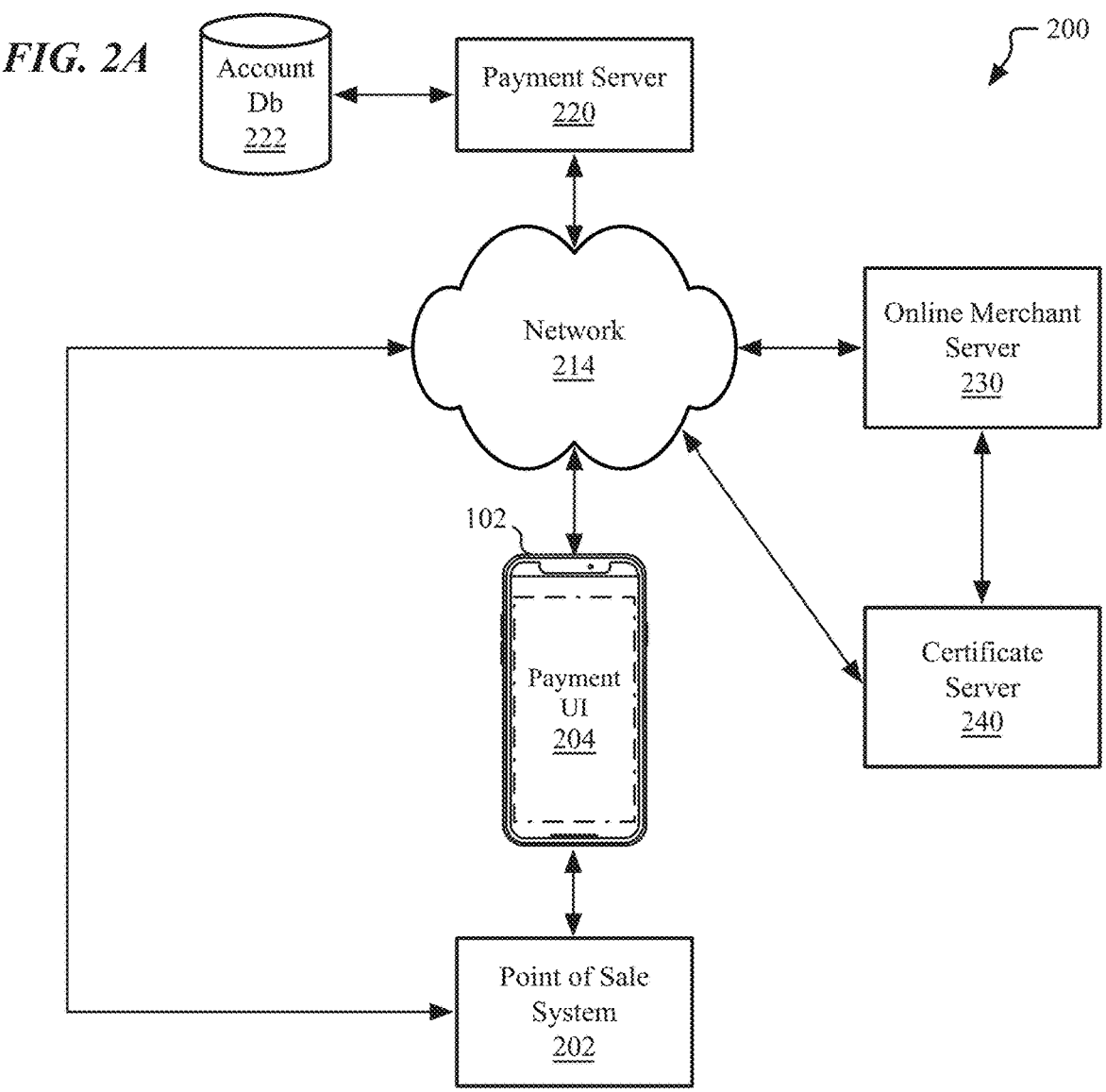
FIG. 2A-2B illustrate an online payment system that includes encryption and signature verification and a possible vulnerability and solution for the online payment system.
Figure 2B:
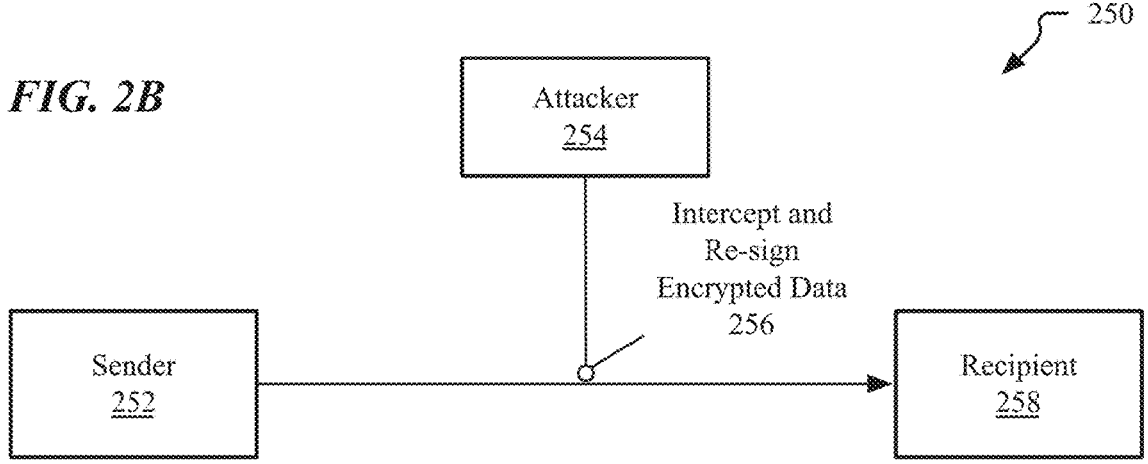

FIG. 2A-2B illustrate an online payment system 200 that includes encryption and signature verification and a possible vulnerability 250 for the online payment system. FIG. 2A illustrates an online payment system 200 that enables transactions with merchants without sharing the details of the payment mechanism with those merchants. FIG. 2B illustrates a possible vulnerability 250 for the online payment system 200.

As shown in FIG. 2A, the online payment system 200 includes a mobile device 102 having a payment user interface 204 and/or a point of sale system 202. The mobile device 102 or point of sale system 202 can communicate over a network 214 with a payment server 220 and/or online merchant server 230. The network 214 may be a network similar to the wide area network 114 of FIG. 1. The mobile device 102 can be either of mobile device 102A and mobile device 102B, as illustrated in FIG. 1. The mobile device 102 can present a payment user interface 204 via a display of the mobile device 102 that facilitates use of the online payment system 200 to pay for goods and/or services. Payment are performed via the online payment system 200 without exposing the specific details of the underlying payment mechanism (e.g., credit card number).

Transactions can be performed via an application on the mobile device 102 or via a point of sale system 202. When a payment is performed via an application, the mobile device 102 can select the online payment system 200 as a payment mechanism for use with the online merchant server 230 and can select a specific payment mechanism to use via the online payment system 200. The specific dataflow can vary across embodiments. In one embodiment, a cryptogram (e.g., encrypted data message) can be created by the mobile device 102 that includes encrypted information. The encrypted information can be used to identify a payment mechanism associated with a user account on the mobile device 102, where the user account is also associated with the online payment system 200. The encrypted information does not include personally identifiable information of the user or the explicit details of the payment mechanism. The mobile device 102 can transmit the cryptogram to the online merchant server 230 via the network 214 along with a purchase request. The online merchant server 230 can then re-encrypt the cryptogram with a merchant key and transmit the re-encrypted cryptogram to the payment server 220. The payment server 220 can then decrypt the re-encrypted cryptogram and verify the validity of the cryptogram. After the cryptogram is verified by the payment server 220, the payment server can encrypt a payment credential for use by the mobile device 102 for use in rendering payment to the online merchant server 230 and transmit the encrypted payment credential to the mobile device 102. The mobile device 102 can receive the encrypted payment credential and via the payment application in which payment is performed, can transmit the encrypted payment credential to the online merchant server 230. The online merchant server 230 can decrypt the payment credential and, if the payment credential is valid, approve payment for the goods and/or services to be purchased.

The mobile device 102 can also render payment for goods and/or services at the physical location of a merchant via the point of sale system 202. The precise data flow may vary according to embodiments. In one embodiment, the mobile device 102 can use a short range wireless radio technology, such as near field communication (NFC), to transmit a unique device number and transaction specific dynamic security code to the point of sale system 202. The point of sale system 202 can verify the unique device number and the transaction specific dynamic security code with the payment server 220 and approve payment.

In one embodiment the mobile device 102, online merchant server 230, and payment server 220 may each communicate with a certificate server 240 to retrieve and/or verify certificates used by the mobile device 102 and/or online merchant server 230 to attest to the authenticity of the respective devices or servers. For example, the mobile device 102 can have a public key that can be verified via a certificate that is used via the certificate server 240. The user account on the mobile device 102 may also have a public key that can be verified via a certificate. The online merchant server 230 and/or payment server 220 can also have keys or identities that can be verified via a certificate issued by the certificate server 240.

The payment server 220 can communicate with an account database 222 that stores information on user accounts. The account database 222 can include user account information for a user account associated with the mobile device 102. Each user account can include payment material that the user/account holder of the mobile device can use to pay for goods and/or services via the online payment system 200. The payment server 220 can locate an account based on a payment material provided by the mobile device 102 via the online merchant server 230 or point of sale system 202. The payment transaction can be recorded in association with the appropriate account in the account database 222 without directly exposing the account information in the account database 222 to the online merchant server 230 or the merchant associated with the point of sale system 202. Payment may be denied when the provided payment material is not consistent (e.g., an expiration date does not correspond to a credit, debit or gift card number) or when no account includes payment material matching that from the POS communication.

In one embodiment, application-based payment via the online merchant server 230 and payment via the point of sale system 202 are secured via biometric credentials, such as a fingerprint or facial recognition. The biometric credentials may be gathered by the mobile device 102 and verified before the payment process is initiated by the mobile device. In one embodiment, one or more identifiers, keys, and/or certificates associated with the payment process are securely stored in a secure processor or secure memory. Access to the securely stored identifiers, keys, and/or certificates can be unlocked based on successful biometric authentication, or via a fallback authentication mechanism (e.g., passcode, password, PIN).

As shown in FIG. 2B, a possible vulnerability 250 may exist in some implementations of an online payment system 200 in which an attacker 254 may intercept and re-sign encrypted data 256 when the data is being transmitted from a sender 252 to a recipient 258. The sender 252 may be, for example, the mobile device 102 or the point of sale system 202. The recipient 258 may be the online merchant server 230 or the payment server 220. If the online payment system 200 does not include a mechanism to cryptographically link the encryptor and the signer of a cryptogram, the online payment system 200 may be vulnerable to a scenario in which an attacker can intercept a purchase request or payment attempt that includes a signed cryptogram generated by the sender 252, strip the signature from the cryptogram, and re-sign the cryptogram using a signature generated by the attacker 254. The attacker 254 may then be able to use payment credentials within the cryptogram to pay for goods and/or services for the benefit of the attacker 254. While the attacker 254 may not be able to decrypt the cryptogram or otherwise gain access to the underlying payment details of the sender 252, the attacker can at least temporarily leverage the cryptogram of the sender 253 to illegitimately acquire goods or services from the recipient. Embodiments described provided techniques to harden a payment systems against such attacks.

Guaranteed Encryptor Authenticity

A payment system 200 as in FIG. 2A may be hardened against a vulnerability 250 as in FIG. 2B by enabling guaranteed encryptor authenticity, such that the encryptor of a cryptogram and a signer of the cryptogram can be verified as the same party, or at the least have joint possession of the same set of secret cryptographic material.

Figure 3A:
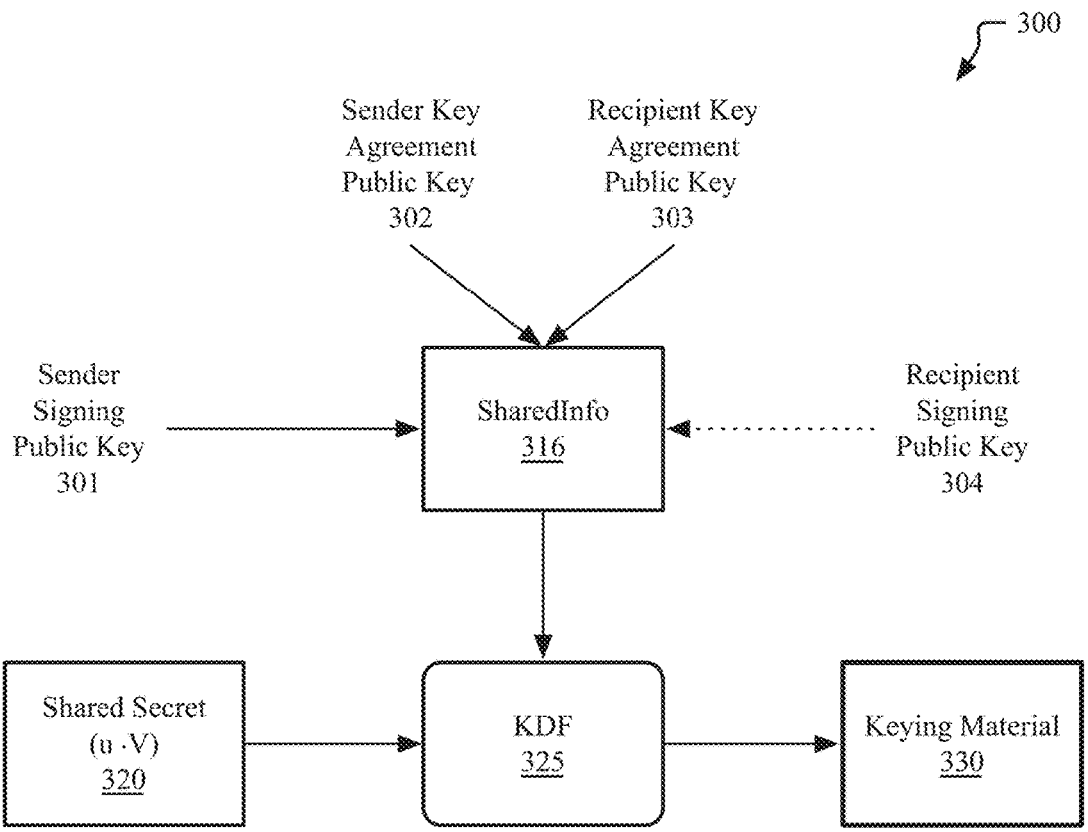
FIG. 3A-3B illustrate an encryption system for an online payment system to enable verification that a sender and a signer in an online payment system are the same party.
Figure 3B:
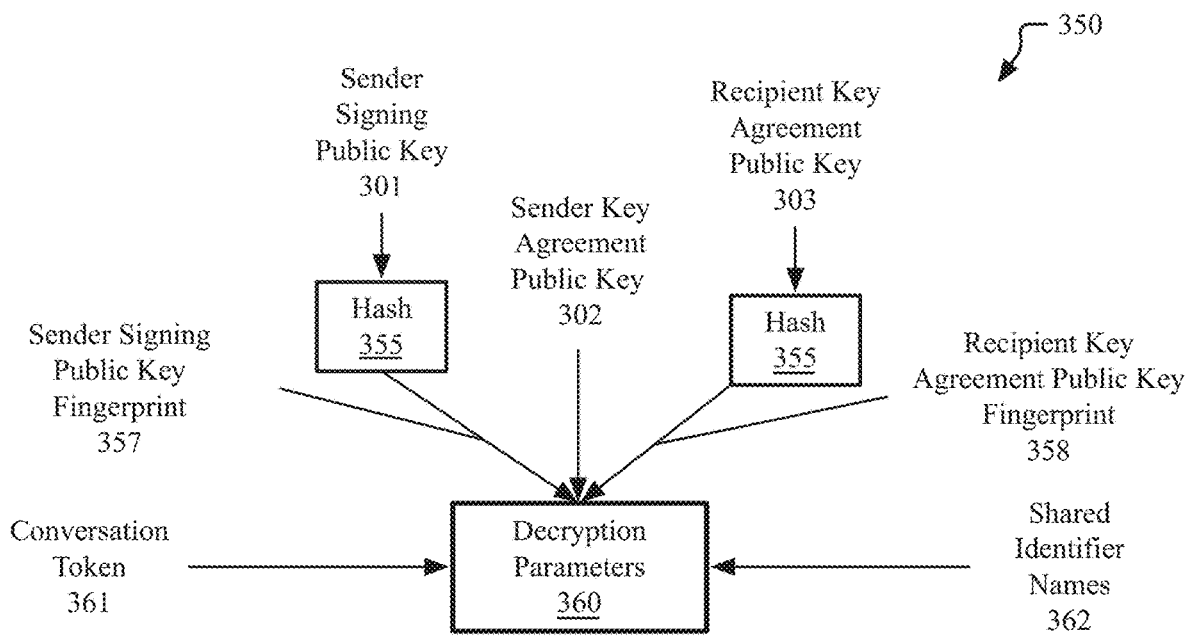

FIG. 3A-3B illustrate an encryption system for an online payment system to enable verification that a sender and a signer in an online payment system are the same party. FIG. 3A illustrates a subsystem 300 to generate encryption keying material that is cryptographically bound to the signer. FIG. 3B illustrates a subsystem 350 to generate decryption parameters that further enable a recipient to verify encryptor authenticity.

As shown in FIG. 3A, subsystem 300 provides a portion of a cryptosystem that includes a sharedinfo structure 316 that is provided as input to a key derivation function (KDF 325) along with a shared secret 320 to generate keying material 330. The keying material 330 is provided as input to an encryption algorithm to enable the generation of a cryptogram that identifies a user or user account and a payment mechanism associated with the user or user account. The cryptogram can also be used to verify encryptor authenticity by enabling a recipient to verify that the sender of the cryptogram and the signer of a signed message that includes the cryptogram are the same party.

The sharedinfo structure 316 is generated based on a sender signing public key 301, sender key agreement public key 302, and a recipient key agreement public key 303. The sender key agreement public key 302 may be an ephemeral key that is generated for each message. In one embodiment the sharedinfo structure 316 may optionally include the recipient signing public key 304 if the recipient has an associated signing public key and the recipient signing public key 304 is available to the sender. The use of the sender signing public key 301 and optionally the recipient signing public key 304 in the encryption key derivation process will cryptographically bind sender/recipient signing keys with the cryptographic material used to generate encryption/decryption keys for cryptograms transmitted within the electronic payment system. In one embodiment the sharedinfo structure 316 can also include a conversation salt and one or more shared identifiers that are pre-agreed upon by the sender and the recipient.

The shared secret 320 can be generated using a key agreement protocol and may be generated by the sender using a key agreement private key of the sender (u) and a key agreement public key of the recipient (V), such that the shared secret is key combination (u V). In one embodiment the shared secret can be generated based on one of a variety of key agreement protocols, such as but not limited to the Diffie-Hellman key agreement protocol, the elliptic curve Diffie Hellman key agreement protocol (ECDH). Key agreement can be performed using static trusted keys or ephemeral keys.

The KDF 325 can be one of a variety of key derivation functions, where a key derivation function is a mathematical operation that transforms the shared secret 320 and other parameters, such as the sharedinfo structure 316, into keying material 330. The keying material 330 includes, in one embodiment, a symmetric encryption key and an initialization vector for use with an encryption algorithm. The KDF 325 may be, but is not limited to the ANSI-X9.63-KDF, IKEv2-KDF, TLS-KDF, or NIST-800-56-Concatenation-KDF. The encryption algorithm for which the keying material 330 is used may be, but is not limited to a variant of the advanced encryption standard (AES) algorithm, such as AES-128, AES-192, or AES-256.

As shown in FIG. 3B, subsystem 350 provides a portion of a cryptosystem that includes a decryption parameters 360 that may be used to enable a recipient to verify encryptor authenticity. The decryption parameters 360 can be used to enable identification and verification of parameters that will be provided to the KDF by the recipient. In one embodiment, the sender signing public key 301 and the recipient key agreement public key 303 can be provided as input to a hash function 355. The hash function 355 may be, for example, the SHA-256 function, although other hash functions may be used. The hash of the sender signing public key 301 can be used as a sender signing public key fingerprint 357. The hash of the recipient key agreement public key 303 can be used as a recipient key agreement public key fingerprint 358. The recipient can use the sender signing public key fingerprint 357 to verify the sender signing public key 301 that will be provided to the key derivation function. The recipient can use the recipient key agreement public key fingerprint 358 to verify that the sender used the correct recipient key agreement public key. Where the recipient may have multiple public keys, the recipient key agreement public key fingerprint 358 can be used by the recipient to identify the specific recipient key agreement public key that the sender used to generate the shared secret. Additionally where the recipient signing public key is also to be used in the key derivation process, a fingerprint for the recipient signing public key can also be included in the decryption parameters 360 to enable the recipient to verify the recipient signing public key to be used to derive the symmetric key.

In one embodiment the decryption parameters 360 can also include additional parameters that may be used to facilitate key derivation by the recipient. Where the sender is using an ephemeral key agreement key for each message or conversation, the sender key agreement public key 302 may be included in the decryption parameters 360. The additional parameters may also include a conversation token 361 and a set of shared identifier names 362. The conversation token can be a secure random token that identifies a conversation salt that may be used for a transaction between a sender and a recipient. The recipient can use the conversation token to look up a conversation salt that was previously shared with the sender using a private channel. The shared identifier names 362 include an ordered set of names identifying shared info that will be provided to the KDF. The specific set of shared identifiers that will be used can be pre-agreed upon by the sender and the recipient. The conversation salt identified by the conversation token 361 and the shared identifiers identified by the set of shared identifier names 362 may be included in the sharedinfo structure 316 by the sender. When such data is included in the sharedinfo structure 316 by the sender, the recipient will be required to provide the same information to its key derivation function to derive the proper symmetric key. In one embodiment the decryption parameters 360 may also include an identifier for the cryptosystem algorithm that is in use. The recipient can be configured to reject any message that does not specify or identify the pre-agreed shared identifiers or does not specify the expected cryptosystem algorithm.

Figure 4:
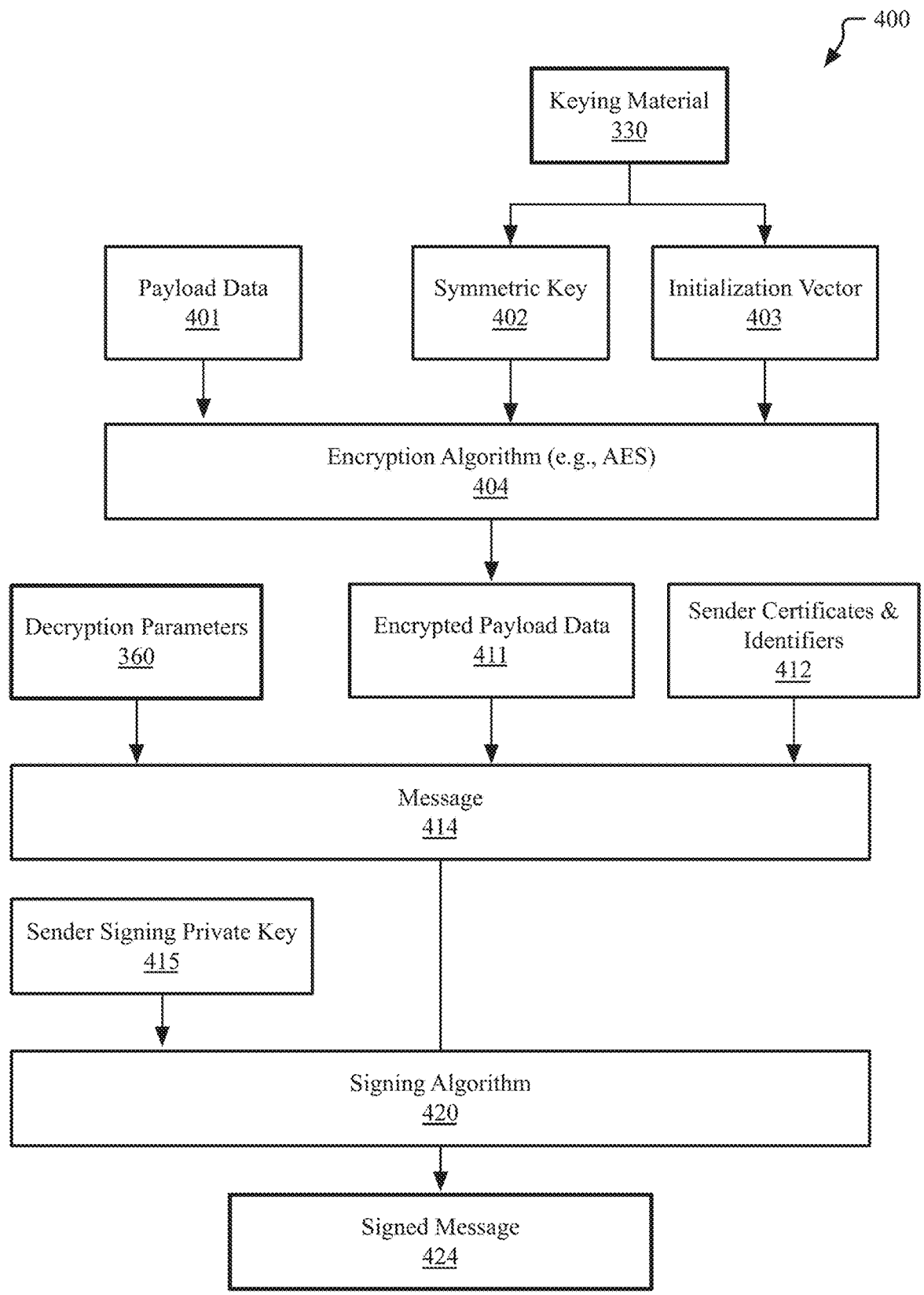
FIG. 4 illustrates a system to generate a signed message to enable verification that a sender and a signer in an online payment system are the same party.

FIG. 4 illustrates a system 400 to generate a signed message to enable verification that a sender and a signer in an online payment system are the same party. Keying material 330 generated via the key derivation function (e.g., KDF 325) can include a symmetric key 402 and an initialization vector 403. For example, the keying material 330 can be 32 bytes, with 16 bytes used as the symmetric key 402 and 16 bytes uses the initialization vector 403. The symmetric key 402, initialization vector 403, and payload data 401 can be provided to an encryption algorithm 404. The encryption algorithm 404 may be, for example, an AES variant as described herein. The encryption algorithm 404 can output an encrypted payload data 411. The encrypted payload data 411, decryption parameters 360, and one or more sender certificates & identifiers 412 can then be combined into a message 414. The message 414 can be provided as input to a signing algorithm 420. The sender signing private key 415 can be used by the signing algorithm 420 to generate a digital signature that can be applied to the message 414 to generate a signed message 424. The signed message 424 can then be transmitted to a recipient for an online payment system, such as the online payment system 200 of FIG. 2.

In one embodiment the sender signing private key 415 is a key that is securely held within a secure processor of the sender device, such as a secure processor 1103 shown in FIG. 11 below. The message 414 may be securely transmitted to the secure processor. The signed message 424, or a signature that may be used to generate the signed message 424, may be returned by the secure processor to an application processor of the sender device.

In one embodiment the sender certificates & identifiers 412 can be retrieved from and/or validated by the certificate server 240 as in FIG. 2A. Static and trusted keys for a device can have an associated certificate that can be used to enable the recipient to verify the legitimacy of those keys. The sender can use device specific hardware identifiers to request a certificate from the certificate server 240 that can be used to attest to the validity of the signing public key of the sender. Thus, the recipient can independently verify, via the certificate server, that the sender signing public key that is used to verify signatures generated by the sender is the legitimate signing public key of the sender. As the sender public key is used by the sender and the recipient to derive a symmetric encryption key, the encrypted payload data 411 will not be able to be decrypted unless the sender and the encryptor possess the same protected cryptographic material, and thus are, at the least, very likely, if not guaranteed, to be the same party.

Figure 5A:
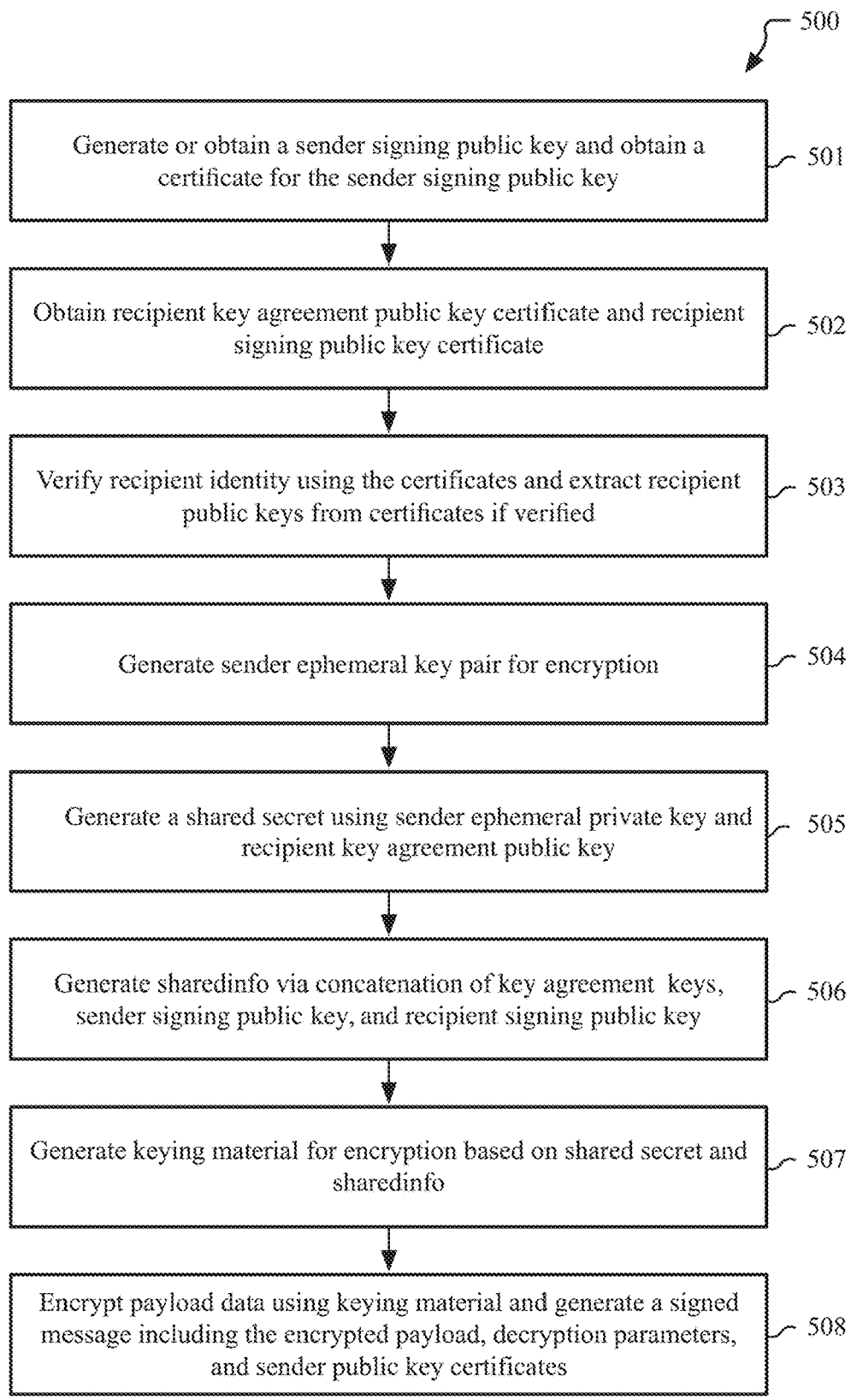
FIG. 5A-5B illustrate methods to generate cryptographic material to encrypt and decrypt a payload.
Figure 5B:
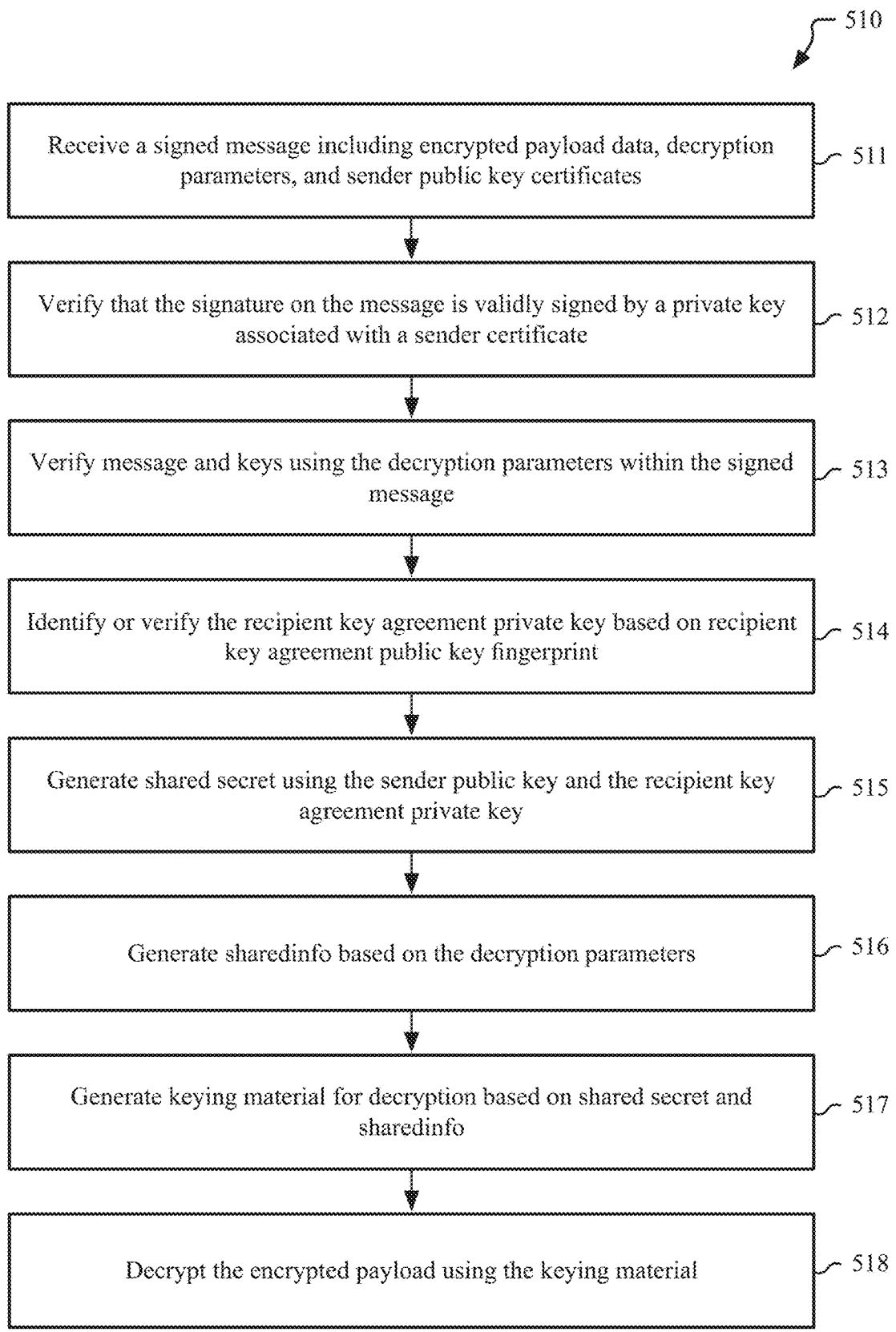

FIG. 5A-5B illustrate methods 500, 510 to generate cryptographic material to encrypt and decrypt a payload. FIG. 5A illustrates a method 500 at a sender to generate a signed message including encrypted payload data. FIG. 5B illustrates a method 510 at a recipient to verify the signed message and decrypt the encrypted payload data. The sender and recipient in the methods below may be any sender or recipient of a message during operation of the online payment system 200 of FIG. 2A. Techniques are provided to enable the verification of encryptor authenticity to mitigate against the possible vulnerability 250 illustrated in FIG. 2B. With reference to FIG. 2A, mitigation can be enabled, for example, but not limited to messages between the mobile device 102 and the online merchant server 230, the point of sale system 202 and the payment server 220, the online merchant server 230 and the payment server 220, or any message that includes a cryptogram that contains data that may intercepted and re-purposed illegitimately to acquire goods and/or services via the online payment system 200.

As shown in FIG. 5A, method 500 includes for a sender to generate or obtain a sender signing public key and obtain a certificate for the sender signing public key (501). The sender public signing key can be a public key of a public/private key pair that is derived based on credentials of an online account associated with the sender. The sender public signing key may also be a public key that is derived from or associated with a device specific private key that is stored on a secure processor and/or within secure memory. The sender can obtain the certificate for the sender signing public key from a certificate server (e.g., certificate server 240) by providing information that attests to the validity of the sender. The certificate server may verify the attestation data (e.g., via an attestation service) and provide the certificate to the sender after verification of the attestation data.

The sender can then obtain a recipient key agreement public key certificate and a recipient signing public key certificate (502). The certificates can be obtained from a certificate server (e.g., certificate server 240). The sender can bypass obtaining the recipient signing public key certificate if the recipient does not have a public signing key, if the public signing key is not made available to the sender, or if a determination is otherwise made to not make use of the recipient signing public key in the key derivation process. The use of the recipient signing public key can be based on a pre-agreement between the sender and recipient. For example, the use of the recipient signing public key can be based on a protocol version or sub-version that is agreed upon for use in transactions performed between the sender and the recipient. The sender can then verify recipient identity using the certificates and extract recipient public keys from certificates if the identity of the recipient is verified (503).

In one embodiment, where the key agreement protocol makes at least partial use of ephemeral keys, the sender can generate an ephemeral key pair for use in the encryption process (504). The sender can then generate a shared secret using the sender ephemeral private key and the recipient key agreement public key (505). The sender can then generate a sharedinfo structure (e.g., sharedinfo structure 316) via a concatenation of the key agreement keys, sender signing public key, and recipient signing public key if the recipient signing public key is to be used (506). The sender can then generate keying material (e.g., keying material 330) for encryption based on the shared secret and the sharedinfo (507). In one embodiment, the keying material can be generated via a KDF having exemplary key derivation logic shown in Table 1.

TABLE 1

Key Derivation Logic

01 Z = generate_shared_secret(KeyAgreementProtocol(SenderPrivateKey, RecipientPublicKey))
02 sharedInfo = computeSharedInfo( )
03 counter = initialize_counter( )
04 KeyingMaterial = Hash(Z | counter | sharedInfo)

The specific logic of the specific KDF used can vary between embodiments. Various key agreement protocols can be used. Where ECIES is used, various elliptic curves may be used. The illustrated key derivation logic makes use of a counter value that is incremented for each key data octet that is generated as keying material. The length of the keying material that is generated may be specified as input to the KDF. In one embodiment the keying material includes a symmetric key and an initialization vector (e.g., symmetric key 402, initialization vector 403) that may be used to encrypt a payload that is or includes a cryptogram used by the online payment system described herein. The sender can then encrypt payload data using the keying material and generate a signed message including the encrypted payload, decryption parameters, and sender public key certificates (508).

As shown in FIG. 5B, method 510 includes for a recipient to receive a signed message including encrypted payload data, decryption parameters, and sender public key certificates (511). The recipient can verify that the signature on the message is validly signed by a private key associated with a sender certificate (512). For example, the sender public key certificates can include a certificate associated with the sender signing public key. The sender signing public key certificate can include data to enable the recipient to validate the message signature. The recipient can then verify the message and associated cryptographic keys using the decryption parameters within the signed message (513). For example, the recipient can verify that the message specifies the correct version of the cryptographic algorithm and includes the proper identifiers. A sender signing public key fingerprint (e.g., sender signing public key fingerprint 357) can be used as additional verification for the sender signing public key. Where the decryption parameters include an ephemeral sender key agreement public key (e.g., sender key agreement public key 302), the validity of the sender key agreement public key can be determined. For example, if the sender key agreement public key is an elliptic curve key, the key can be verified to ensure that the key is valid on a pre-agreed named curve.

The recipient can identify or verify the recipient key agreement private key to used based on the recipient key agreement public key fingerprint (514). The recipient key agreement public key fingerprint (e.g., recipient key agreement public key fingerprint 358) can be used to verify that the recipient key agreement public key used by the sender to generate the shared secret corresponds with the recipient key agreement private key to be used by the recipient. The recipient key agreement public key fingerprint can also be used to identify the correct recipient key agreement private key to use to generate the shared secret if the recipient makes use of multiple public/private key pairs.

The recipient can generate shared secret using the sender key agreement public key and the recipient key agreement private key (515). The recipient can use a key agreement protocol that is pre-determined with the sender to derive the shared secret. The recipient can also generate or reconstruct the sharedinfo structure using data identified by or included within the decryption parameters (516). The recipient can then generate keying material for decryption based on shared secret and sharedinfo (517). If the keying material is correct, the recipient can decrypt the encrypted using the keying material (518). However, if an attacker has substituted an intercepted encrypted payload within a message that is validly signed by the attacker, the generated symmetric key will be incorrect. The attacker cannot modify the original message without causing signature verification to fail. If the attacker attempts to forge a new message using the encrypted payload and a signature generated by the attacker, the recipient will be able to determine that the fingerprint of the signing public key for use in validating the signature differs from the sender signing public key fingerprint in the decryption parameters of the message. If the attacker attempts to substitute the information within the decryption parameters to facilitate the verification of the message signature, the recipient will be unable to generate the correct symmetric key to successfully decrypt the encrypted payload.

Figure 6A:
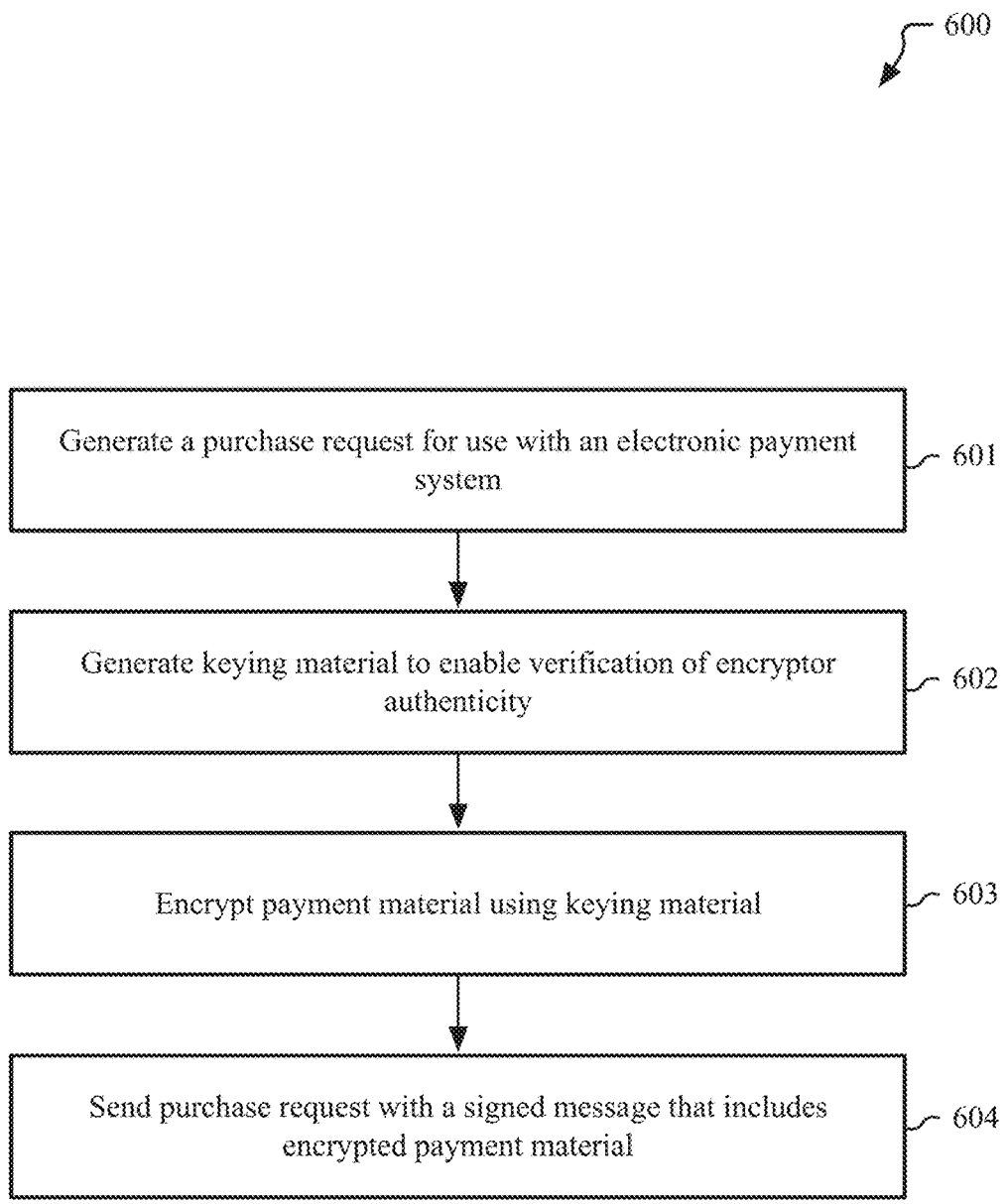
FIG. 6A-6B illustrate methods to verify encryptor authenticity in an online payment system.
Figure 6B:
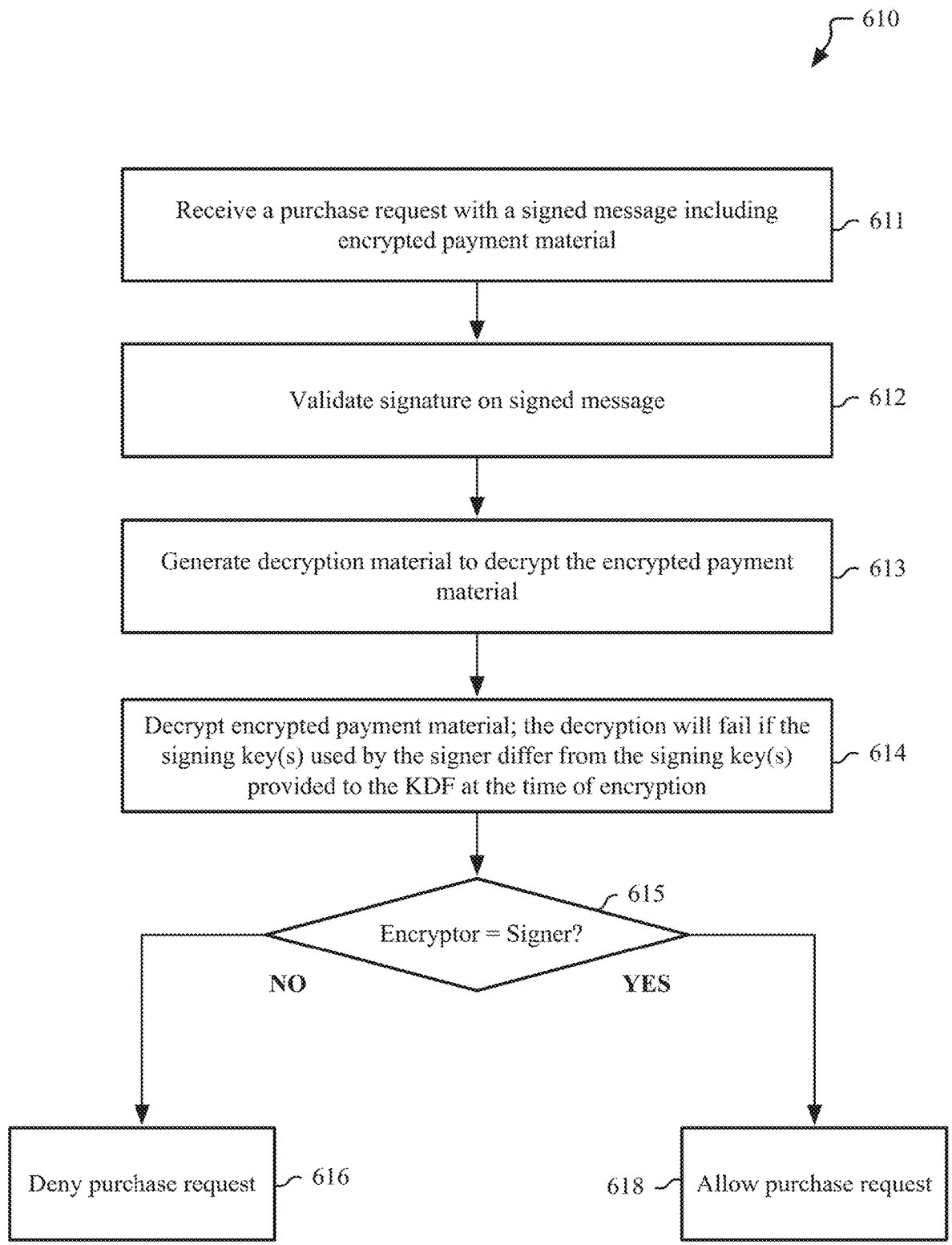

FIG. 6A-6B illustrate methods 600, 610 to verify encryptor authenticity in an online payment system. FIG. 6A illustrates a method 600 to enable a purchasing device to generate a purchase request that enables the verification of encryptor authenticity for the request. FIG. 6B illustrates a method 610 to enable a recipient (e.g., merchant server, payment server) of a message within the online payment system to verify encryptor authenticity for an encrypted payload within the message.

As shown in FIG. 6A, a purchasing device can generate a purchase request for use with an electronic payment system (601). As part of generating the purchase request, the purchasing device can generate keying material to enable verification of encryptor authenticity (602). The purchasing device can then encrypt payment material using keying material (603). The purchasing device can then send the purchase request with a signed message that includes encrypted payment material (604). The purchase request may include data packaged in a secure message container in the form of a structured data object. The structured data object may be, but is not limited to a JavaScript object notation (JSON) data object that is secured using a JSON web signature (JWS). Other message formats may also be used.

With additional reference to FIG. 2A, in one embodiment, method 600 is performed by a mobile device 102 that is configurable to execute payment logic that can interact with the online payment system 200. In one embodiment the purchasing device may also be a point of sale system 202 in communication with a payment server 220 after receipt of a payment identifier from the mobile device 102. In one embodiment the purchasing device may be an online merchant server 230 in communication with the payment server 220 when attempting to acquire payment for a purchase request initiated by the mobile device 102.

As shown in FIG. 6B, a message recipient within the online payment system can receive a purchase request with a signed message including encrypted payment material (611). The recipient can validate signature on the signed message (612). The recipient can then generate decryption material to decrypt the encrypted payment material (613). Using the decryption material, the recipient can decrypt the encrypted payment material; the decryption will fail if the signing key(s) used by the signer differ from the signing key(s) provided to the KDF at the time of encryption (614). If the encryptor and the signer are the same party ("YES," 615), the recipient can allow the purchase request (618). If the encryptor and the signer are not the same party ("NO," 615), the recipient can deny the purchase request (616). Detection that the encryptor and the signer are not the same party can occur in a variety of ways depending on the nature of the attack that is being attempted. For example, the signature on the signed message may fail to validate. It is also possible that the decryption of the encrypted payment material will fail, as the proper symmetric key will not be generated by the message recipient due to the tampering of the message by the attacker. In any scenario, it is not possible for an attacker to formulate a purchase request that includes a valid signature and that also enables the message recipient to derive a symmetric key that will successfully decrypt the encrypted payment material unless the attacker possesses cryptographic material held only by the original sender of the message. Such material may be securely held in secure memory or within a secure processor and may not be accessible, even to the application processor on of the device that originates the purchase request.

Exemplary Computing Architectures, Devices, and Network Environments

Figure 7:
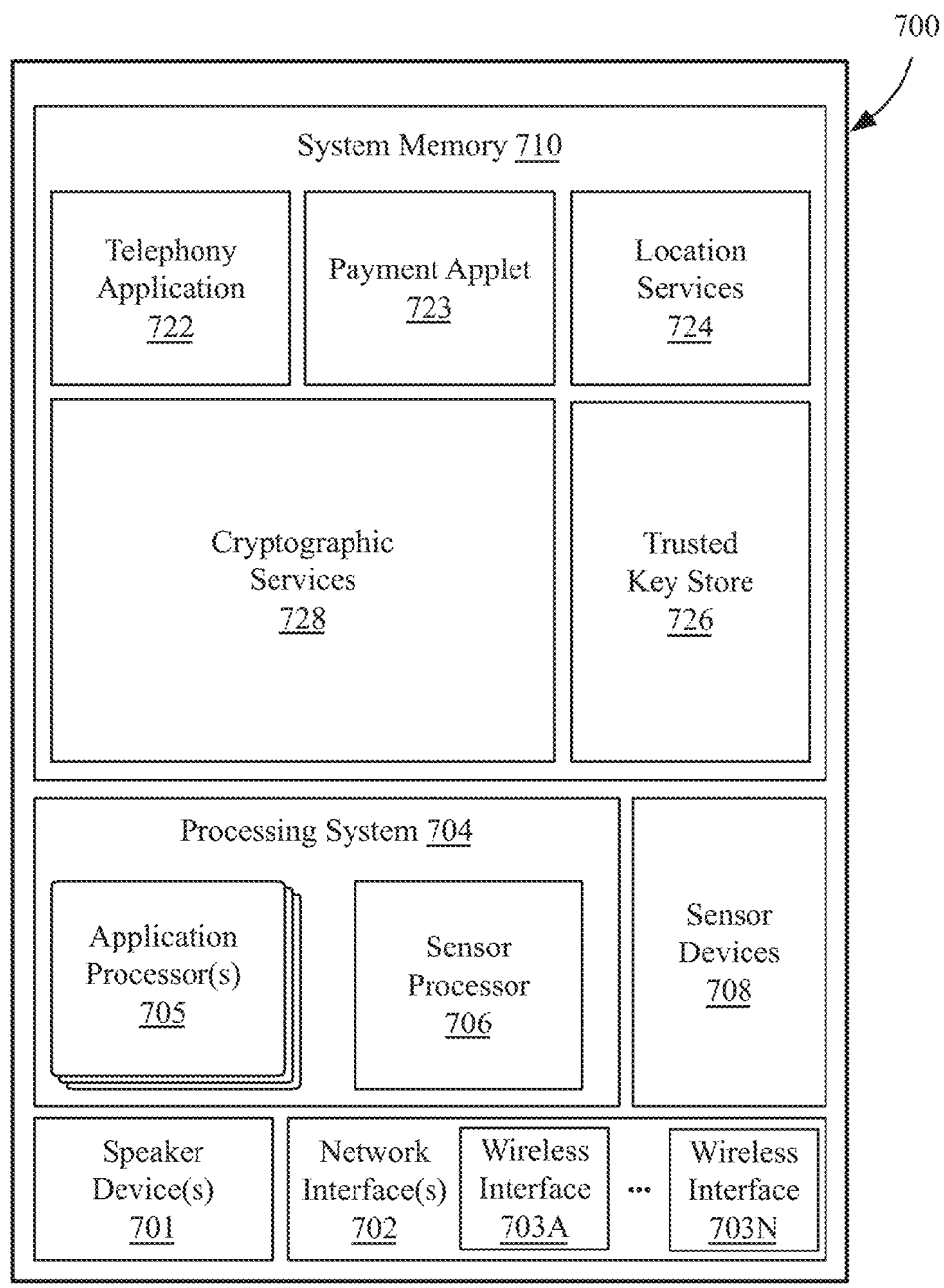
FIG. 7 is a block diagram of a system architecture associated with a mobile device 102, according to an embodiment.

FIG. 7 is a block diagram of a system architecture 700 associated with a mobile device 102, according to an embodiment. The system architecture 700 can include one or more speaker devices 701 to enable playback of the audio portion of media, alarm, alert, notification, or telephone calls played on or performed by the mobile device 102. The mobile device 102 also includes one or more network interfaces 702, which can include one or more wireless interfaces 703A-703N to enable wireless network connectivity. The one or more wireless interfaces 703A-703N can couple with baseband processing logic that enables support for wireless networking protocols such as, but not limited to Bluetooth, Wi-Fi, near field communication (NFC), other wireless networking technologies. In some implementations, the network interface 702 may also support a wired network connection.

The computing device also includes a processing system 704 having multiple processor devices. In one embodiment the processing system 704 includes one or more application processor(s) 705 to execute instructions for user and system applications that execute on the computing device. The processing system can also include a sensor processor to process and monitor a suite of sensor devices 708 having sensors including, but not limited to motion sensors, light sensors, proximity sensors, biometric sensors, audio sensors (e.g., microphones), and image sensors (e.g., cameras). The sensor processor 706 can enable low-power monitoring of always-on sensors within the suite of sensor devices 708. The sensor processor 706 can allow the application processor(s) 705 to remain in a low power state when the mobile device 102 is not in active use while allowing the mobile device 102 to remain accessible via voice or gesture input to a virtual assistant or to incoming network data received via the network interface 702.

In one embodiment the mobile device 102 includes a system memory 710 which can be a system virtual memory having an address space that includes volatile and non-volatile memory. The system memory 710 can include a telephony application 722, a payment applet 723, and location services logic 724. The telephony application 722 enables the mobile device 102 to contact an emergency service provider. The payment applet 723 can enable the mobile device to make purchases via an online payment system 200 as in FIG. 2. The location services logic 724 enables software logic to query current and historical location data for the mobile device having the system architecture 700. The system memory 710 can also include a cryptographic services library 728 that provides encryption primitives that are accelerated using cryptographic engines within the mobile device. The cryptographic services library can interact with a trusted key store 726, which stores keys and certificates that are generated for use by a mobile device 102 having the system architecture 700, or received from trusted external sources. Certificates received from the certificate server 240 of FIG. 2A may be stored in the trusted key store 726. The payment applet 723 can use primitives provided by the cryptographic services library 728 to perform cryptographic operations described herein.

Figure 8:
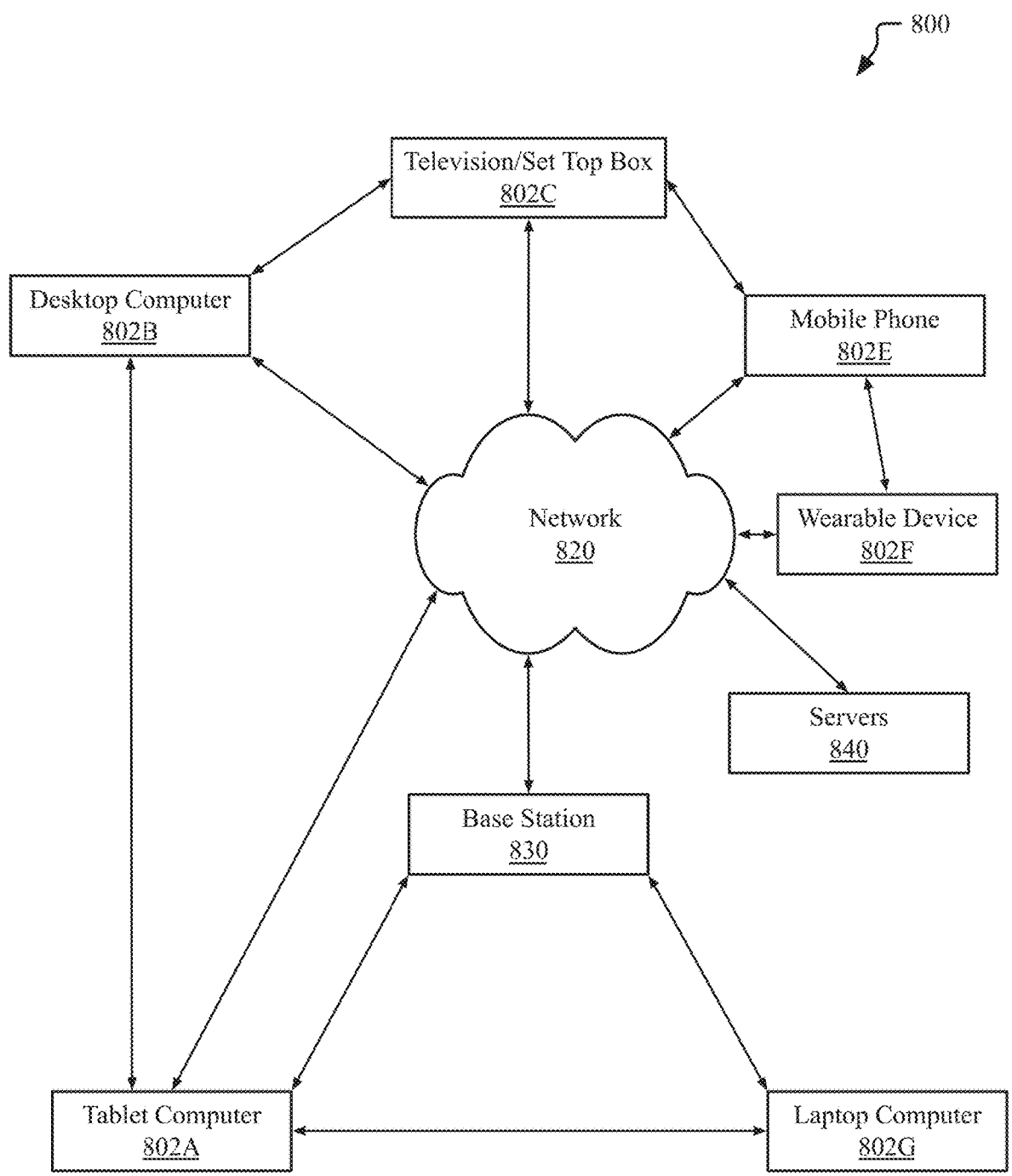
FIG. 8 illustrates an overview of a network environment in which an online payment system may be implemented.

FIG. 8 illustrates an overview of a network environment 800 in which an online payment system may be implemented. The network environment 800 can include one or more electronic devices such as a tablet computer 802A, a desktop computer 802B, a television or set top box 802C, a mobile phone 802E, wearable device 802F, and/or a laptop computer 802G, which may be referred to collectively as electronic devices 802. Electronic devices 802 within range of one another can establish a peer-to-peer communication channel via a direct communication link (e.g., a Bluetooth link, an infrared (IR) link, or the like). Further, the electronic devices 802 can be connected to a network 820, either directly or via a connection to a base station 830. The base station 830 can be, for example, a network access device (e.g., a router, cellular base station, or the like) which provides the electronic devices 802 with network access.

The network environment 800 can also include a set of servers 840 that are accessible to the electronic devices 802 via the network 820. The servers 840 can include online merchant servers, payment servers, and certificate servers as illustrated in FIG. 2A. The servers 840 can also include servers to provide authentication and data storage for user accounts associated with the electronic devices 802, including servers that facilitate access to one or more account databases. The servers 840 may be physical servers, virtual servers, or a combination of physical and virtual servers.

The network 820 can be any suitable type of wired or wireless network such as a local area network (LAN), a wide area network (WAN), or combination thereof. A LAN can be implemented using various network connection technologies such as, but not limited to Ethernet, wireless LAN (e.g., Wi-Fi), and/or wireless personal area networks (WPAN). LAN communication over the network 820 can be performed using network protocols such as, but not limited to transmission control protocol (TCP) and Internet protocol (IP). A WAN can be implemented over various physical layer types including fiber-optic and copper cabling using protocols such as, but not limited to synchronous optical networking (SONET) and synchronous digital hierarchy (SDH).

During operation, any of the electronic devices 802 can use software logic associated with an application or web browser to initial purchase requests with an online merchant server within the set of servers 840. In a retail environment, a mobile phone 802E or wearable device 802F can exchange data over a short range wireless protocol with a point of sale system. The point of sale system may be coupled with the servers 840 via a wireless connection to a base station 830 or via a wired connection to an electronic device 802 such as a desktop computer 802B, tablet computer 802A, or laptop computer 802G. In one embodiment a tablet computer 802A may operate directly as a point of sale system using software logic executed on the tablet computer.

In one embodiment, in addition to a purchase request to an online merchant, payment offers and/or requests may be exchanged between electronic devices 802 associated with different users. In such embodiment the network environment 800 can facilitate direct payment between individuals via the online payment system. For example, an instant messaging system that is used by the electronic devices 802 can be used as a relay mechanism for payment offers and/or requests. Payment offers and/or requests may be secured via the guaranteed encryptor authenticity techniques described herein.

Figure 9:
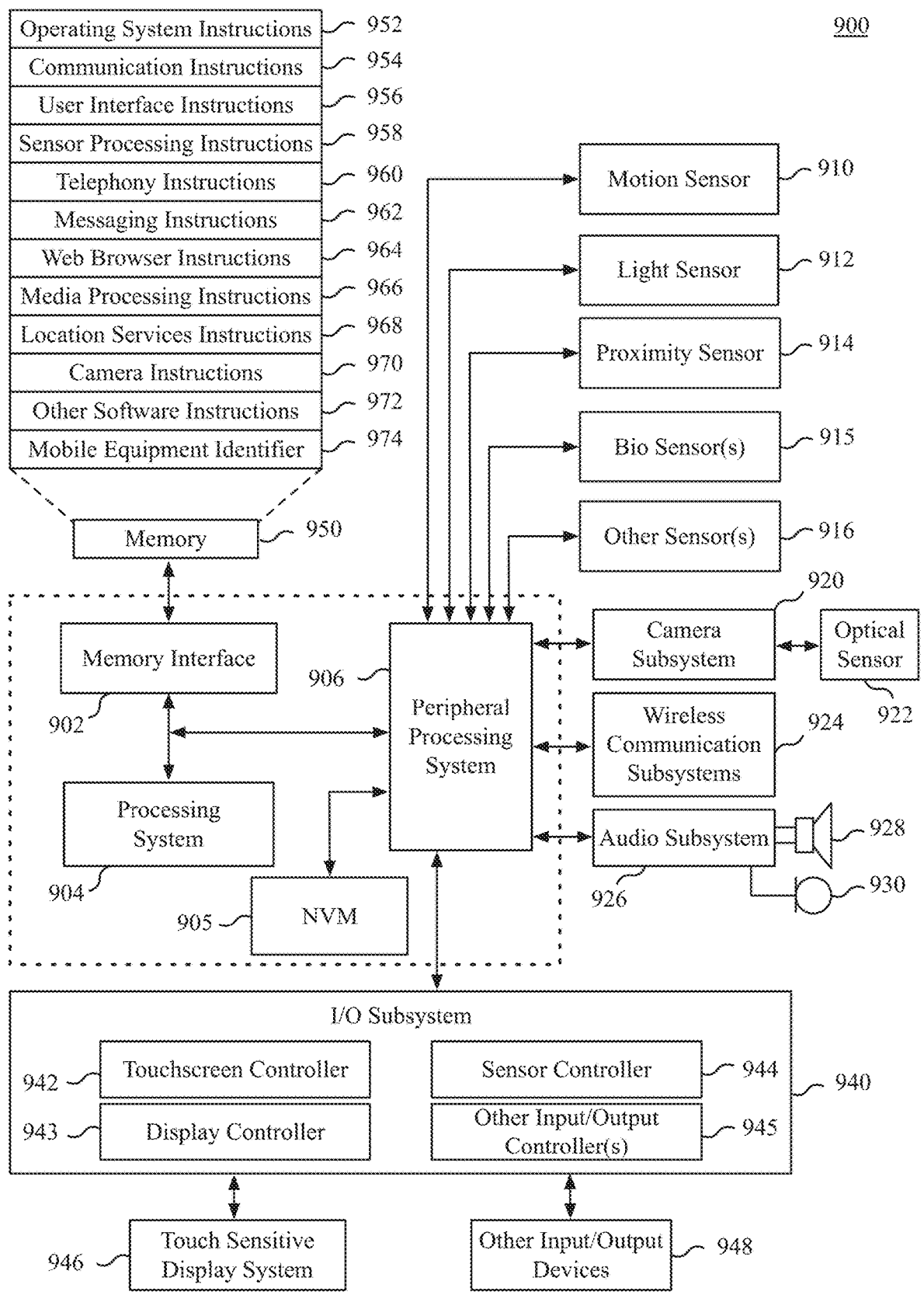
FIG. 9 is a block diagram of a device architecture for a mobile or embedded device, according to an embodiment.

FIG. 9 is a block diagram of a device architecture 900 for a mobile or embedded device, according to an embodiment. The device architecture 900 includes a memory interface 902, a processing system 904 including one or more data processors, image processors and/or graphics processing units, and a peripherals interface 906. The various components can be coupled by one or more communication buses or signal lines. The various components can be separate logical components or devices or can be integrated in one or more integrated circuits, such as in a system on a chip integrated circuit.

The memory interface 902 can be coupled to memory 950, which can include high-speed random-access memory such as static random-access memory (SRAM) or dynamic random-access memory (DRAM) and/or non-volatile memory 905, such as but not limited to flash memory (e.g., NAND flash, NOR flash, etc.).

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate the mobile device functionality. One or more biometric sensor(s) 915 may also be present, such as a fingerprint scanner for fingerprint recognition or an image sensor for facial recognition. Other sensors 916 can also be connected to the peripherals interface 906, such as a positioning system (e.g., GPS receiver), a temperature sensor, or other sensing device, to facilitate related functionalities. A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the wireless communication subsystems 924 can depend on the communication network(s) over which a mobile device is intended to operate. For example, a mobile device including the illustrated device architecture 900 can include wireless communication subsystems 924 designed to operate over a GSM network, a CDMA network, an LTE network, a Wi-Fi network, a Bluetooth network, or any other wireless network. In particular, the wireless communication subsystems 924 can provide a communications mechanism over which a media playback application can retrieve resources from a remote media server or scheduled events from a remote calendar or event server.

An audio subsystem 926 can be coupled to a speaker 928 and a microphone 930 to facilitate voice-enabled functions, such as voice recognition, voice replication, digital recording, and telephony functions. In smart media devices described herein, the audio subsystem 926 can be a high-quality audio system including support for virtual surround sound.

The I/O subsystem 940 can include a touch screen controller 942 and/or other input controller(s) 945. For computing devices including a display device, the touch screen controller 942 can be coupled to a touch sensitive display system 946 (e.g., touch-screen). The touch sensitive display system 946 and touch screen controller 942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 946. Display output for the touch sensitive display system 946 can be generated by a display controller 943. In one embodiment, the display controller 943 can provide frame data to the touch sensitive display system 946 at a variable frame rate.

In one embodiment, a sensor controller 944 is included to monitor, control, and/or processes data received from one or more of the motion sensor 910, light sensor 912, proximity sensor 914, or other sensors 916. The sensor controller 944 can include logic to interpret sensor data to determine the occurrence of one of more motion events or activities by analysis of the sensor data from the sensors.

In one embodiment, the I/O subsystem 940 includes other input controller(s) 945 that can be coupled to other input/control devices 948, such as one or more buttons, rocker switches, thumb-wheel, infrared port, USB port, and/or a pointer device such as a stylus, or control devices such as an up/down button for volume control of the speaker 928 and/or the microphone 930.

In one embodiment, the memory 950 coupled to the memory interface 902 can store instructions for an operating system 952, including portable operating system interface (POSIX) compliant and non-compliant operating system or an embedded operating system. The operating system 952 may include instructions for handling basic system services and for performing hardware dependent tasks. In some implementations, the operating system 952 can be a kernel.

The memory 950 can also store communication instructions 954 to facilitate communicating with one or more additional devices, one or more computers and/or one or more servers, for example, to retrieve web resources from remote web servers. The memory 950 can also include user interface instructions 956, including graphical user interface instructions to facilitate graphic user interface processing.

Additionally, the memory 950 can store sensor processing instructions 958 to facilitate sensor-related processing and functions; telephony instructions 960 to facilitate telephone-related processes and functions; messaging instructions 962 to facilitate electronic-messaging related processes and functions; web browser instructions 964 to facilitate web browsing-related processes and functions; media processing instructions 966 to facilitate media processing-related processes and functions; location services instructions including GPS and/or navigation instructions 968 and Wi-Fi based location instructions to facilitate location based functionality; camera instructions 970 to facilitate camera-related processes and functions; and/or other software instructions 972 to facilitate other processes and functions, e.g., security processes and functions, and processes and functions related to the systems. The memory 950 may also store other software instructions such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. A mobile equipment identifier, such as an International Mobile Equipment Identity (IMEI) 974 or a similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions may be implemented in hardware and/or in software, including in one or more signal processing and/or application specific integrated circuits.

Figure 10:
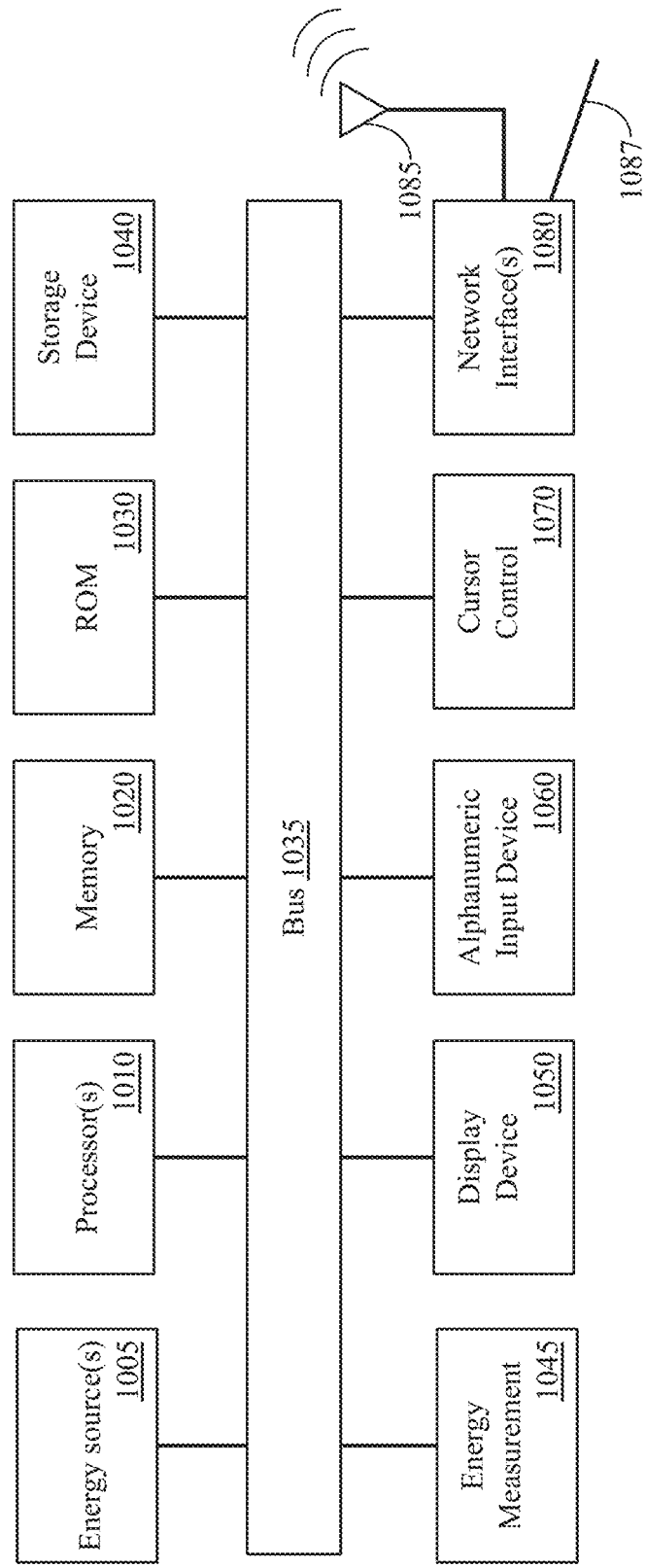
FIG. 10 is a block diagram of a computing system, according to an embodiment.

FIG. 10 is a block diagram of a computing system 1000, according to an embodiment. The illustrated computing system 1000 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer, and/or different components. The computing system 1000 can be used to provide the computing device and/or a server device to which the computing device may connect.

The computing system 1000 includes bus 1035 or other communication device to communicate information, and processor(s) 1010 coupled to bus 1035 that may process information. While the computing system 1000 is illustrated with a single processor, the computing system 1000 may include multiple processors and/or co-processors. The computing system 1000 further may include memory 1020 in the form of random-access memory (RAM) or other dynamic storage device coupled to the bus 1035. The memory 1020 may store information and instructions that may be executed by processor(s) 1010. The memory 1020 may also be main memory that is used to store temporary variables or other intermediate information during execution of instructions by the processor(s) 1010.

The computing system 1000 may also include read only memory (ROM) 1030 and/or another data storage device 1040 coupled to the bus 1035 that may store information and instructions for the processor(s) 1010. The data storage device 1040 can be or include a variety of storage devices, such as a flash memory device, a magnetic disk, or an optical disc and may be coupled to computing system 1000 via the bus 1035 or via a remote peripheral interface.

The computing system 1000 may also be coupled, via the bus 1035, to a display device 1050 to display information to a user. The computing system 1000 can also include an alphanumeric input device 1060, including alphanumeric and other keys, which may be coupled to bus 1035 to communicate information and command selections to processor(s) 1010. Another type of user input device includes a cursor control 1070 device, such as a touchpad, a mouse, a trackball, or cursor direction keys to communicate direction information and command selections to processor(s) 1010 and to control cursor movement on the display device 1050. The computing system 1000 may also receive user input from a remote device that is communicatively coupled via one or more network interface(s) 1080.

The computing system 1000 further may include one or more network interface(s) 1080 to provide access to a network, such as a local area network. The network interface(s) 1080 may include, for example, a wireless network interface having antenna 1085, which may represent one or more antenna(e). The computing system 1000 can include multiple wireless network interfaces such as a combination of Wi-Fi, Bluetooth®, near field communication (NFC), and/or cellular telephony interfaces. The network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, the network interface(s) 1080 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1000 can further include one or more energy sources 1005 and one or more energy measurement systems 1045. Energy sources 1005 can include an AC/DC adapter coupled to an external power source, one or more batteries, one or more charge storage devices, a USB charger, or other energy source. Energy measurement systems include at least one voltage or amperage measuring device that can measure energy consumed by the computing system 1000 during a predetermined period of time. Additionally, one or more energy measurement systems can be included that measure, e.g., energy consumed by a display device, cooling subsystem, Wi-Fi subsystem, or other frequently used or high-energy consumption subsystem.

Figure 11:
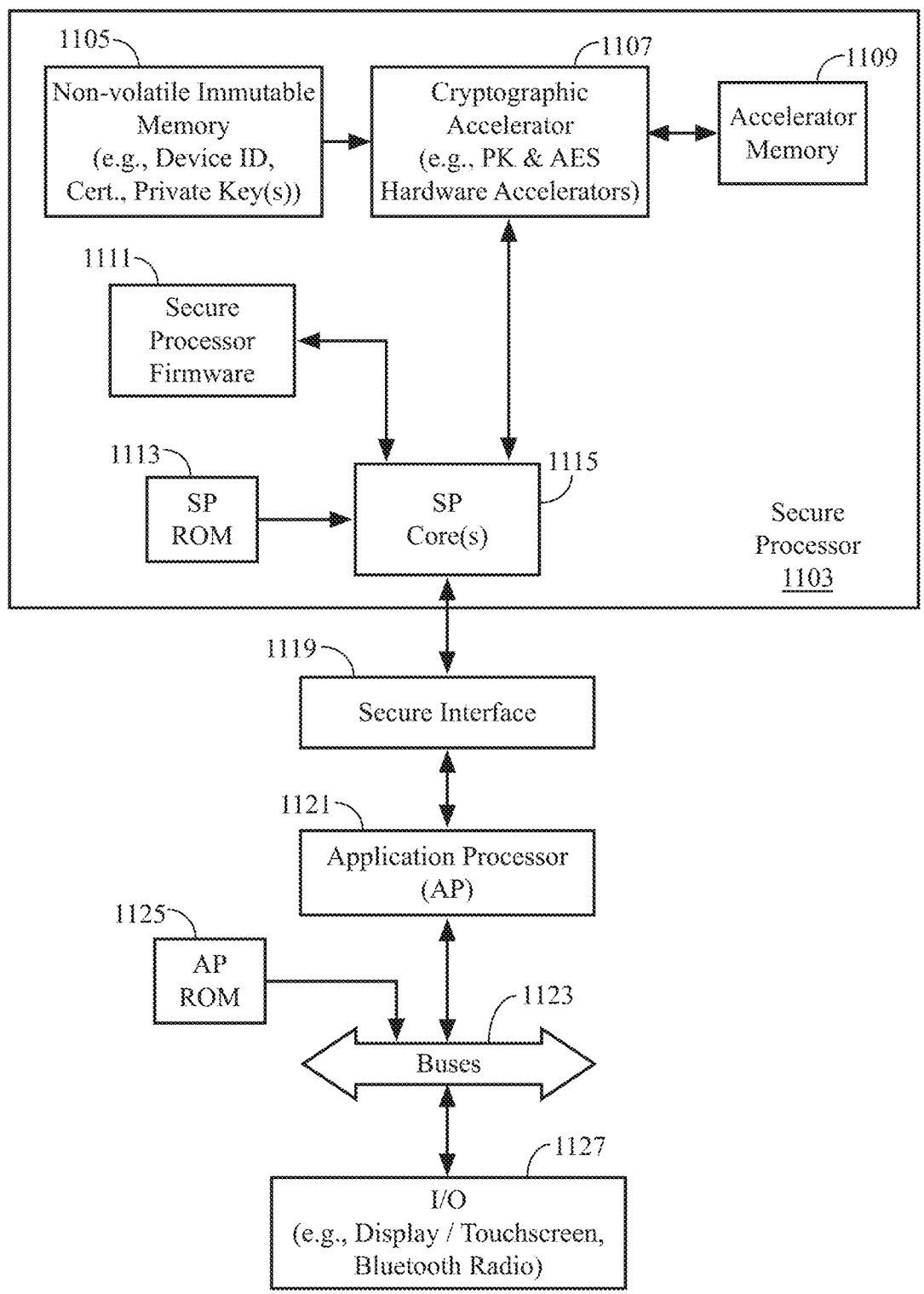
FIG. 11 illustrates a computing system including a secure processor, according to an embodiment.

FIG. 11 illustrates a computing system 1100 including a secure processor, according to an embodiment. In one embodiment the illustrated secure processor 1103 is a secure enclave processor, although other types of secure processors may be used to accelerate cryptographic operations described herein. The computing system 1100 can enable a device to perform secure accelerated cryptographic operations, to provide secure storage for a subset of private keys, and to enable the encryption of other private keys. A version of the computing system 1100 can be included in a primary device (e.g., smartphone) and a secondary device (e.g., computing device, wearable device, wireless accessory) as described herein.

The computing system 1100 includes an application processor 1121 that is communicably coupled with a secure processor 1103 via a secure interface 1119. The computing system 1100 can be a portion of any of the client devices described herein. Additionally, the computing system 1100 can be included into one or more of the servers described herein. In one embodiment, the secure processor 1103 can be implemented as a system on chip. In another embodiment, the application processor 1121 and the secure processor 1103 can be implemented on a system on chip and include one or more processors and memory controllers and other components on a single integrated circuit.

The secure processor 1103 can perform cryptographic operations as described herein, as well as other system security operations such as encrypting user files or verifying code signatures, processing user passcodes, or performing other security operations. The cryptographic operations can be performed in part by the secure processor core 1115 by executing software stored as firmware 1111 in the secure processor 1103. The secure processor core 1115 can also be coupled to a ROM 1113 which can be trusted software that can validate the software in the firmware 1111 before allowing that firmware to execute by checking a code signature of the firmware and verifying that the signature code indicates that the firmware is valid and has not been corrupted before allowing the firmware to be executed by the secure processor core 1115.

The secure processor 1103 can also include a cryptographic accelerator such as cryptographic accelerator 1107 which can perform asymmetric cryptography as well as symmetric cryptography using a hardware accelerator. The cryptographic accelerator 1107 can be coupled to non-volatile and immutable memory 1105 which can store in a secure manner a device identifier or a set of device identifiers and a set of one or more certificates and private keys which are hidden from the rest of the system and are not readable by the rest of the system in one embodiment. The cryptographic accelerator 1107 has access to the private keys and other data within the non-volatile and immutable memory 1105 and access to such memory is not allowed for components outside of the secure processor 1103. In one embodiment, the cryptographic accelerator 1107 can be coupled to an accelerator memory 1109 which can be a scratch pad memory used to perform the cryptographic operations that are performed by the cryptographic accelerator 1107. The application processor 1121 can be coupled to one or more buses 1123 which are coupled to one or more input and output (I/O) devices 1127, such as a touchscreen display a Bluetooth radio, an NFC radio, a Wi-Fi radio, etc. Other input and output devices can be included. The application processor 1121 is also coupled to an application processor ROM 1125, which provides software to boot the application processor. Similarly, the ROM 1113 provides code to boot the secure processor core 1115 within the secure processor 1103.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set, which may be an extension to an instruction set architecture for particular a type of microprocessor. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

One embodiment provides a non-transitory machine readable medium storing instructions which, when executed by one or more processors of an electronic device, cause the one or more processors to perform operations. The operations include, but are not limited to generating, at the electronic device, a request for use with an online payment system, deriving keying material to encrypt payment information, the keying material derived based on an encryption private key and a signing public key, generating encrypted payment material by encrypting the payment material using the keying material, wherein the payment material identifies a payment mechanism associated with the electronic device, generating a message to send to a server of the online payment system, the message including the encrypted payment information, wherein the message is associated with the request, generating a message signature using the message and a signing private key, the signing private key associated with the signing public key, sending the message and message signature to the server, wherein successful validation of the message signature and successful decryption of the encrypted payment material validates that the encrypted payment material and the signature of the message were generated by a same party, and receiving, from the server, an affirmative response to the request based on a determination that the encrypted payment material and the signature of the message were generated by a same party.

One embodiment provides for a server device associated with an online payment system. The server device includes a network interface, memory, and one or more processors coupled with the network interface and the memory. The one or more processors can execute instructions stored in the memory. The instructions, when executed, cause the one or more processors to receive, via the network interface, a request with a signed message including encrypted payment material, the request associated with the online payment system, validate a signature of the signed message via a signing public key of a sender of the request, generate decryption material to decrypt the encrypted payment material, the decryption material generated based in part on a signing public key of the sender, decrypt the encrypted payment material, wherein successful validation of the signature and successful decryption of the encrypted payment material validates that the encrypted payment material and the signature of the message were generated by the same party, and deny the request in response to determination that the encryptor of the encrypted payment material and the signer of the message are not the same party.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A method, performed by an electronic device, the electronic device comprising:
deriving, responsive to a purchase request input to an application or Web browser installed on the electronic device, keying material to encrypt payment material, wherein the keying material is derived based on (1) a shared secret, the shared secret generated by combining an encryption private key of the electronic device and an ephemeral public key of a payment server and (2) a signing public key of the electronic device;
encrypting the payment material using the keying material to produce encrypted payment material, wherein the payment material identifies a payment mechanism associated with the electronic device;
generating a signature using a signing private key of the electronic device;
sending the encrypted payment material and the signature to the payment server via a merchant server associated with the application or Web browser;
receiving, from the payment server, a credential generated in response to determining that the encrypted payment material and the signature were generated by the electronic device;
sending the credential to the merchant server to establish an exchange of value based on the payment mechanism; and
confirming the exchange of value through the application or Web browser.

2. The method of claim 1, wherein the payment material is configured to identify an account in an account database associated with the payment server.

3. The method of claim 1, wherein the deriving the keying material further comprises sending, with the encrypted payment material and the signature, a hash of the ephemeral public key of the payment server.

4. The method of claim 3, wherein the keying material is further derived from a shared information structure determined based on the signing public key of the electronic device, the ephemeral public key of the payment server, and a signing public key of the payment server.

5. The method of claim 3, further comprising:
deriving an initialization vector based on the shared secret and the signing public key of the electronic device; and
using the initialization vector to derive the keying material.

6. The method of claim 1, further comprising:
generating an ephemeral key pair including an ephemeral private key; and
using the ephemeral private key as the encryption private key of the electronic device.

7. The method of claim 1, wherein the payment material indirectly identifies the payment mechanism without including personally identifiable information of a user of the application or Web browser.

8. A non-transitory machine readable medium storing a plurality of instructions that, when executed by one or more processors of an electronic device, causes the one or more processors to:
derive, responsive to a purchase request input to an application or Web browser installed on the electronic device, keying material to encrypt payment material, wherein the keying material is derived based on (1) a shared secret, the shared secret generated by combining an encryption private key of the electronic device and an ephemeral public key of a payment server and (2) a signing public key of the electronic device;
encrypt the payment material using the keying material to produce encrypted payment material, wherein the payment material identifies a payment mechanism associated with the electronic device;
generate a signature using a signing private key of the electronic device;
send the encrypted payment material and the signature to the payment server via a merchant server associated with the application or Web browser;

receive, from the payment server, a credential generated in response to determining that the encrypted payment material and the signature were generated by the electronic device;

send the credential to the merchant server to establish an exchange of value based on the payment mechanism; and confirm the exchange of value through the application or Web browser.

9. The non-transitory machine readable medium of claim 8, wherein the payment material is configured to identify an account in an account database associated with the payment server.

10. The non-transitory machine readable medium of claim 8, wherein the plurality of instructions causes the or more processors to derive the keying material from a shared information structure including the signing public key of the electronic device, the ephemeral public key of the payment server, and a signing public key of the payment server, and the instructions further cause the one or more processors to send, with the encrypted payment material and the signature, a hash of the ephemeral public key of the payment server.

11. The non-transitory machine readable medium of claim 10, wherein the instructions further cause the one or more processors to:

derive an initialization vector based on the shared secret and the signing public key of the electronic device; and use the initialization vector to derive the keying material.

12. The non-transitory machine readable medium of claim 8, wherein the instructions further cause the one or more processors to:

generate an ephemeral key pair including an ephemeral private key; and use the ephemeral private key as the encryption private key of the electronic device.

13. The non-transitory machine readable medium of claim 8, wherein the payment material is configured to indirectly identify the payment mechanism without including personally identifiable information of a user of the application or Web browser.

14. An electronic device comprising:

a memory;

one or more processors communicatively coupled to the memory and configured to execute instructions stored in the memory for performing operations of:

deriving, responsive to a purchase request input to an application or Web browser installed on the electronic device, keying material to encrypt payment material, wherein the keying material is derived based on (1) a shared secret, the shared secret generated by combining an encryption private key of the electronic device and an ephemeral public key of a payment server and (2) a signing public key of the electronic device; encrypting the payment material using the keying material to produce encrypted payment material, wherein the payment material identifies a payment mechanism associated with the electronic device;

generating a signature using a signing private key of the electronic device;

sending the encrypted payment material and the signature to the payment server via a merchant server associated with the application or Web browser;

receiving, from the payment server, a credential generated in response to determining that the encrypted payment material and the signature were generated by the electronic device;

sending the credential to the merchant server to establish an exchange of value based on the payment mechanism; and confirming the exchange of value through the application or Web browser.

15. The computing device of claim 14, wherein the payment material is configured to identify an account in an account database associated with the payment server.

16. The computing device of claim 14, wherein the operation of deriving the keying material further comprises the operation of sending, with the encrypted payment material and the signature, a hash of the ephemeral public key of the payment server.

17. The computing device of claim 16, wherein the keying material is further derived from a shared information structure determined based on the signing public key of the electronic device, the ephemeral public key of the payment server, and a signing public key of the payment server.

18. The computing device of claim 16, wherein the one or more processors are further configured to execute instructions for performing operations of:

deriving an initialization vector based on the shared secret and the signing public key of the electronic device; and using the initialization vector to derive the keying material.

19. The computing device of claim 14, wherein the one or more processors are further configured to execute instructions for performing operations of:

generating an ephemeral key pair including an ephemeral private key; and using the ephemeral private key as the encryption private key of the electronic device.

20. The computing device of claim 14, wherein the payment material indirectly identifies the payment mechanism without including personally identifiable information of a user of the application or Web browser.

* * * * *

UNITED STATES PATENT AND TRADEMARK OFFICE
CERTIFICATE OF CORRECTION

| | | |
|---|---|---|
| PATENT NO. | : 12,095,907 B2 | |
| APPLICATION NO. | : 17/835421 | |
| DATED | : September 17, 2024 | |
| INVENTOR(S) | : Vishnu Pillai Janardhanan Pillai et al. | |

It is certified that error appears in the above-identified patent and that said Letters Patent is hereby corrected as shown below:

In the Claims

Column 23, Line 15: In Claim 10 please delete "causes the or more" and insert --causes the one or more--.

Signed and Sealed this
Fifteenth Day of October, 2024

Katherine Kelly Vidal
*Director of the United States Patent and Trademark Office*